Jan. 17, 1950 J. A. JENSEN ET AL 2,494,762
SAW SET
Filed Sept. 22, 1947 2 Sheets-Sheet 1
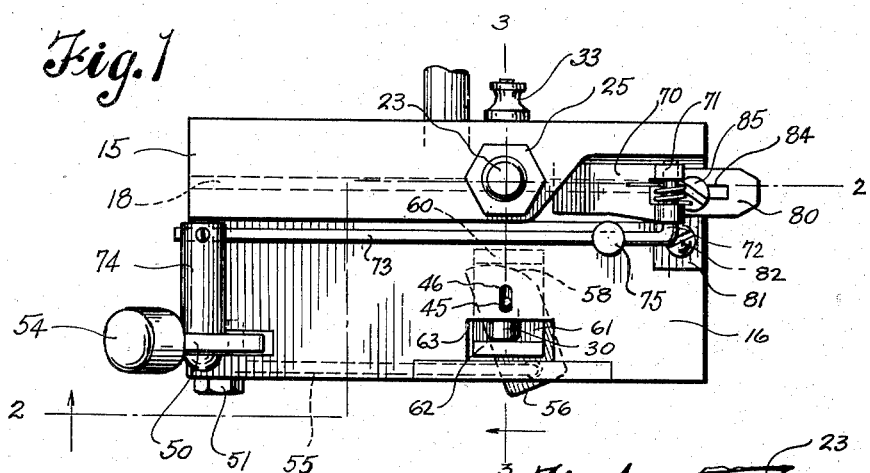
Fig. 1
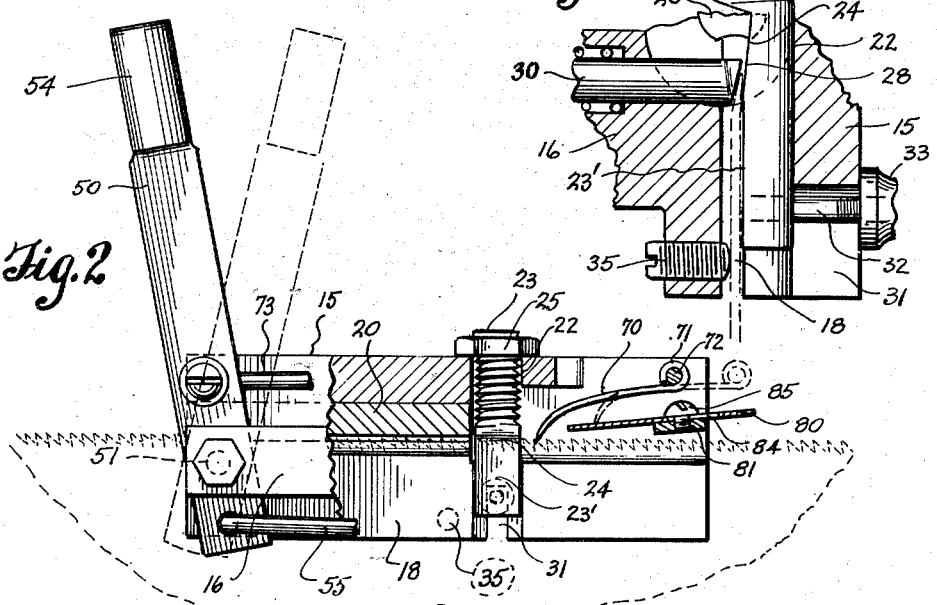
Fig. 2
Fig. 4
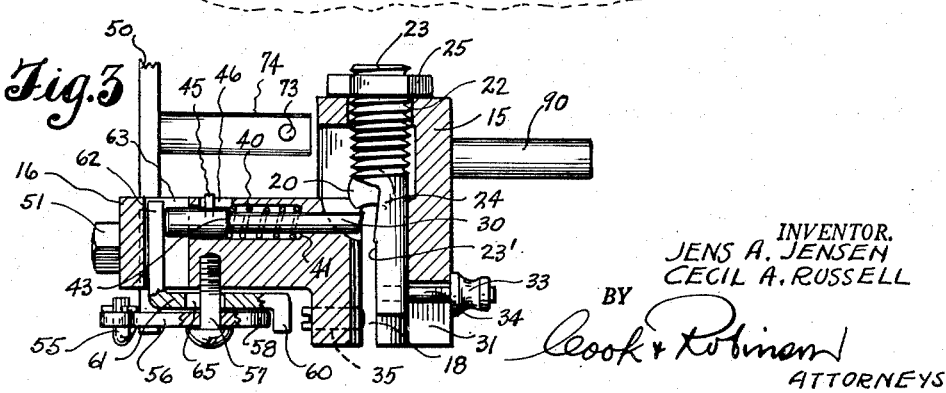
Fig. 3
INVENTOR.
JENS A. JENSEN
CECIL A. RUSSELL
BY
Cook + Robinson
ATTORNEYS

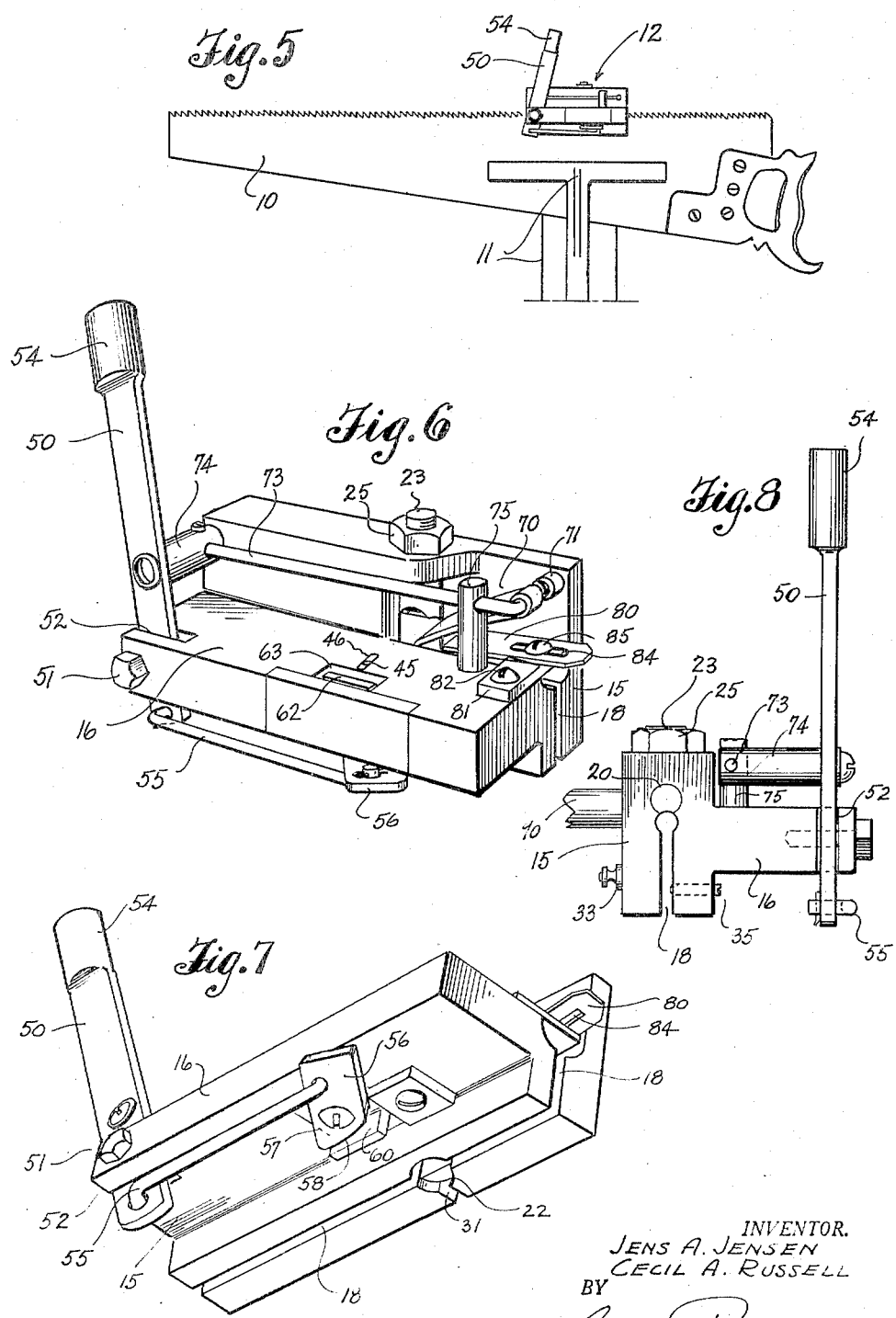

Patented Jan. 17, 1950

2,494,762

UNITED STATES PATENT OFFICE 2,494,762

SAW SET

Jens A. Jensen and Cecil A. Russell,
Seattle, Wash.

Application September 22, 1947, Serial No. 775,410

3 Claims. (Cl. 76—68)

This invention relates to devices for setting the teeth of saws and which are commonly known as "saw sets." More particularly, the invention has reference to improvements in saw sets that are designed primarily for setting the teeth of the ordinary types of hand saws as used by carpenters and which are made in various sizes and vary in the number of teeth per inch.

It is the principal object of this invention to provide a saw set of an automatically indexing type, that can be easily and readily adapted for use with a saw of any number of teeth per inch of blade, which is easy to apply for use, easy to operate and relatively inexpensive to produce.

It is also an object of the invention to provide a saw set of the kind above stated that is designed to be applied for use to the toothed edge of the saw blade after the saw has been secured in a fixed position with its toothed edge horizontally disposed and upwardly facing, and which set includes novel means whereby it will be automatically advanced or indexed, with each tooth setting operation, a distance equal to the spacing of the teeth along the same edge of the blade. Furthermore, a device that is reversible on the blade, both in position and direction of travel so that the teeth along both sides of the blade edge can be set without requirement for readjustment of parts or removal of the saw from its secured position.

It is also an object of this invention to provide means for determining and changing the degree of set of the teeth.

More specifically stated, the objects of the present invention reside in the provision of a saw set of the character above stated, wherein the operating parts are mounted on or in a metal block that is provided along its under side with a guide channel in which the toothed edge of the saw blade is received, to functionally hold and guide the block as advanced by the indexing mechanism along the blade, and wherein a tooth setting hammer plunger is cooperatively associated with an anvil for the setting of the saw teeth and is reciprocally movable by means of a hand lever which, with each reciprocal action, sets one tooth and advances the set a proper interval along the saw blade for the setting of the next tooth.

Still further objects of the invention reside in the details of construction of parts, in their combination and mode of operation as will hereinafter be fully described.

In accomplishing the above mentioned and other objects of the invention, I have provided the improved details of construction, the preferred forms of which are illustrated in the accompanying drawings wherein—

Fig. 1 is a top, or plan view of a saw set embodied by the present invention.

Fig. 2 is a vertical section of the same, taken substantially on line 2—2 in Fig. 1, indicating the relationship of the toothed edge of a saw to the setting and indexing mechanism.

Fig. 3 is a somewhat enlarged cross-sectional view of the saw set taken on line 3—3 in Fig. 1.

Fig. 4 is a cross-sectional detail of the device showing the tooth setting plunger and anvil.

Fig. 5 is an elevational view illustrating the manner of applying the set to a saw for use, and the preferred manner of securing the saw for the tooth setting operation.

Fig. 6 is a perspective view of the present saw set.

Fig. 7 is a perspective view of the same as seen from the under side.

Fig. 8 is an end elevation of the device.

Referring more in detail to the drawings—

In Fig. 5, 10 designates a saw of the type with which the present saw set is intended for use, 11 designates a clamping mechanism whereby the saw may be held secure and in proper position for setting its teeth, and 12 designates, in its entirety, a saw set, embodied by the present invention, as applied to the saw for use in setting those teeth that are formed along one side of the blade, it being understood that the position of the set on the blade is reversed for the setting of those teeth that are formed along the opposite side of the blade.

The saw set, in its present preferred form of construction, comprises a block 15 of metal, formed along one side with a laterally extending flange 16 as shown best in Figs. 6, 7 and 8. To give a better understanding of the size and character of the device, it will be explained that in a practical size for most saws, the block 15 would be approximately six inches long, two inches high and one inch wide, and the flange 16 would extend from the block about one and one-half inches beyond the side as best shown in Fig. 8.

Formed lengthwise of the block and extending the full length thereof and open to its opposite ends and bottom side, is a channel or slot 18 in which the toothed edge of the saw blade may be received, as has been indicated in Figs. 2, 3 and 5, in a manner that permits the block to be shifted along the saw blade from end to end. In order that the sharpened ends of the saw teeth may not wear away the base of the channel, I have set a round bar of hard metal 20, such as steel, in the block to extend along a part of the channel as understood best by reference to Figs. 2 and 3, against which the teeth engage for the proper support of the set.

Formed vertically through the block 10, between its ends, and substantially in the central vertical plane of the channel 18, is a bore or hole 22 in which a bolt 23 is located, and which bolt provides an anvil portion 24 against which the teeth of the saw are set by the action of the plunger hammer.

It is best shown in Figs. 3 and 4, that the lower end portion of the bolt 23 is unthreaded and is cut away along one side to form a flat surface, as at 23', that is flush with the near side surface of channel 18. The upper end portion of the bolt is threaded and is contained for vertical adjustment of the bolt in the hole 22 and is equipped with a nut 25 at its upper end. Just below its threaded portion, the bolt shank is formed with the anvil portion 24. This has a flat surface 28, shown in Fig. 4 to be slightly inclined with respect to the vertical plane of the channel, and against which the teeth of the saw are set by the action of a tooth setting hammer plunger, presently described.

Extending laterally from the lower end portion of the bolt 23 and contained in a slot 31 opening to the lower edge of the block, is a stem 32, and on the stem is threaded a nut 33 that may be tightened against the side of the block to coact with nut 25 in holding the bolt and anvil in place.

The extent of set placed on a tooth may be controlled to some extent by the setting of the anvil surface 28 and with respect to the line of travel of the hammer. After the bolt 23 has been adjusted vertically to locate the anvil at any definite position, the adjustment may be retained by the turning of the nut 25 down against the top of the block and by tightening the nut 33 against a side of the block, as has been illustrated in Fig. 3.

The degree of set further may be controlled by the adjustment of a set screw 35 which is shown best in Fig. 4 as being threaded into the block with its lower end portion entering the channel 18 near the lower end of bolt 23. The inner end of this set screw is rounded, and the screw may be adjusted so as to press the saw blade, shown in dotted lines in Fig. 4, more or less closely against the flat surface of the bolt and cause the tooth to receive greater or lesser set accordingly under the hammer action.

With the device applied to the saw blade as in Fig. 5, the setting of a tooth is accomplished by locating the selected tooth in exact alinement with the hammer and then actuating the hammer inwardly to cause its inner end surface to engage the tooth and force it over against the anvil surface 24 as in Fig. 4, which shows that the inner end surface of the hammer is beveled slightly greater than the slope or bevel of the inner surface of the tooth. Thus when it is actuated against the tooth, as in Fig. 4, the tooth will be set out flatly against the face of the anvil.

Normally the hammer plunger 30 is held yieldingly in a retracted position, as shown in Fig. 3, by means of a coiled spring 40 that bears at one end against a shoulder 41 in the bore 42 in which the hammer is reciprocally contained, and at its other end bears against a shoulder 43 on the outer end of the hammer.

In order that the inner end of the hammer plunger may be held against turning and in proper relationship to the saw tooth, a pin 45 is fixed in its outer end portion for guided travel in a slot 46 in the block, as will be understood by reference to Figs. 1 and 3.

The inward reciprocal, or tooth setting action of the hammer plunger is effected by means of a hand lever 50 that is pivotally mounted by a bolt 51 in a slot 52 formed in the flange 16 at one end thereof as seen in Fig. 6. The upper end portion of the lever is formed with a handle portion 54, while the lower end portion extends slightly below the flange 16 and is connected by a link 55 with the outer end of a cam lever 56, that is pivotally supported from and at the under side of the flange by a bolt 57, as best shown in Figs. 3 and 7.

At its inner end, the cam lever 56 has a curved cam surface 58 (see Figs. 1 and 7) that is adapted to be actuated against a downturned toe or flange 60 formed at the inner end of a link 61 that is disposed between the lever 56 and underside of the flange 16, and which link also has an upturned outer end portion 62 extended into a passage 63 in the block and into position for engagement with the outer end of the hammer plunger 30.

It is shown in Fig. 3 that the link 61 has a longitudinal slot 65 formed therein through which the bolt 57 extends, and it will further be understood that when the hand lever 50 is actuated from the full line position of Fig. 2 to the dotted line position, the cam lever 56 will be actuated against the toe 60 of the link 61 to shift the latter inwardly and cause the hammer plunger to be moved inwardly as in Fig. 4, to engage and set the saw tooth that is aligned therewith. When the hand lever 50 is swung back to starting position, as from the dotted line position of Fig. 2 to the full line position, this frees the cam lever of pressure and allows retraction of the hammer plunger by spring 40. Also, this return of the hand lever operates to index the saw set along the saw blade to position for the setting of the next tooth at that side of the blade. The means for advancing the saw set will now be described, especially in consideration of the parts as shown in Figs. 1 and 2.

It is shown in Figs. 1 and 2 that the metal of the block 10 is cut away above that portion of slot 18 at the right hand end and that when the device is applied to a saw blade as in Fig. 1, the saw teeth will be exposed in that open portion of the block. Also, it is shown that a plate or pawl 70 is supported in this open space to ride upon the toothed edge of the saw when moved outwardly and to engage the teeth when moved inwardly.

The pawl 70 is spring pressed and comprises a curved body portion formed with a loop 71 at its outer end whereby it is pivotally mounted on the laterally turned end portion 72 of an actuating shaft 73. The shaft 73 is fixed at one end in a post or arm 74 that extends inwardly from the hand lever 50, and at near its outer end is guided for reciprocal movement on a post 75 mounted on the block flange 16. When the lever 50 is reciprocally actuated from the full line position of Fig. 2 to the dotted line position, for setting a tooth, the pawl will be shifted outwardly, ratcheting at its inner end over the saw teeth. When the hand lever is actuated in the other direction, the pawl end will engage a tooth and thus cause the block to be advanced along the saw blade.

The extent to which the set should be advanced for each operation is based upon the spacing of the teeth. Since the reciprocal travel of the pawl is the same for all saws, its effective travel has to be regulated in accordance with the number of teeth per inch on the saw being set.

To accomplish this, I provide a pawl guide plate 80 that is fixed on a supporting arm 81 attached by a screw 82 to the block flange. The guide plate extends below the pawl along its path of travel, just above the toothed edge of the saw blade, as shown in Fig. 2, and it is adjustable so that it will operate to determine the position of the pawl when it engages the saw teeth. If the advancement for indexing of the set along the saw is to be increased, then the guide is so shifted that the pawl will sooner engage the teeth. If the movement is to be lesser, then it will be shifted in the other direction to cause its engagement to be later. The advancement should be exactly equal to the spacing of teeth at the same side of the blade. If there are eight teeth to the inch, then there will be four on each side at one-fourth inch intervals. The guide plate could be marked or graduated so that proper adjustment could be easily made without trial on the saw. As noted in Fig. 1, the plate 80 has a longitudinal slot 84 through which a screw 85 extends to secure the plate to the arm 81 at its different positions of adjustment.

To facilitate use of the device, a handle member 90 is fixed in the block and extends inwardly therefrom. One hand of the operator may grasp this handle while the other hand is used to actuate the lever 50.

With the device so constructed, and applied to a saw as in Fig. 5, it is possible to quickly set the teeth along one side of the blade by the reciprocal actuation of lever 50, which in one direction of movement sets a tooth and in its other direction of movement indexes the device forwardly for the next operation. The degree of set is controlled by the position of the anvil and adjustment of set screw 35. When the teeth along one side of the blade have been set, the device is then reversed in position and is advanced along the saw in the other direction.

Having thus described our invention, what we claim as new therein and desire to secure by Letters Patent is:

1. A saw set of the character described comprising a block formed across its under side with a longitudinal solt for the reception of the toothed edge of a saw blade therein and providing for movement and guided travel of the block along the blade, an anvil bolt mounted for up and down adjustment in the block at one side of the slot and having a beveled surface against which the teeth of the saw blade may be set, a tooth setting hammer reciprocally movable in the block at the other side of the slot, a spring acting against the hammer to yieldingly retain it out of contact with the saw teeth, a hand lever pivoted on the block for oscillatory action in the longitudinal direction of the block, an indexing pawl mounted on the block for reciprocal movement and adapted to engage with teeth of the saw for the advancement of the block along the saw blade, a link connecting the hand lever with the pawl for its actuation when the hand lever is swung in one direction, a slide mounted in the block for functional actuation of the hammer, and linkage connecting the hand lever and slide for the actuation of the hammer during retractive movement of the pawl.

2. A saw set as recited in claim 1 wherein a means is provided for adjusting the anvil bolt endwise to shift the beveled surface thereof to meet the length of the saw teeth, and a means is provided for securing the adjustment of the said anvil bolt.

3. A saw set as recited in claim 1 wherein the said longitudinal slot is wider than the normal saw blade and a set screw is threaded into the block substantially directly below the hammer to establish the effective width of the slot and angle of the saw blade relative to the beveled surface of the anvil bolt.

JENS A. JENSEN.
CECIL A. RUSSELL.

REFERENCES CITED

The following references are of record in the file of this patent:

UNITED STATES PATENTS

| Number | Name | Date |
|---|---|---|
| 648,405 | Haltom | May 1, 1900 |
| 650,045 | Haltom | May 22, 1900 |
| 951,767 | Hadley | Mar. 8, 1910 |
| 1,007,697 | Holtin | Nov. 7, 1911 |
| 1,055,712 | Cowell | Mar. 11, 1913 |
| 1,106,829 | Morrill | Aug. 11, 1914 |
| 1,188,144 | Barker | June 20, 1916 |
| 2,356,448 | Daggett | Aug. 22, 1944 |
| 2,425,876 | Hively | Aug. 19, 1947 |